United States Patent [19]

Nougayrede

[11] Patent Number: 6,113,872
[45] Date of Patent: Sep. 5, 2000

[54] PROCESS FOR REMOVING SULFUR COMPOUNDS OUT OF A GAS

[75] Inventor: Jean Nougayrede, Pau, France

[73] Assignee: Elf Exploration Production, Courbevoie, France

[21] Appl. No.: 09/202,487

[22] PCT Filed: Apr. 23, 1998

[86] PCT No.: PCT/FR98/00816

§ 371 Date: Nov. 16, 1998

§ 102(e) Date: Nov. 16, 1998

[87] PCT Pub. No.: WO98/47813

PCT Pub. Date: Oct. 29, 1998

[30] Foreign Application Priority Data

Apr. 24, 1997 [FR] France .................................. 97 05071

[51] Int. Cl.$^7$ ................................................ B01D 53/48
[52] U.S. Cl. .............................. 423/242.1; 423/244.01; 423/573.1; 423/574.1
[58] Field of Search ........................... 423/242.1, 244.01, 423/244.07, 573.1, 574.1

[56] References Cited

U.S. PATENT DOCUMENTS 4,894,216  1/1990  Kvasnikoff et al. ................. 423/574 R
5,077,031  12/1991  Kvasnikoff et al. ................. 423/574 R

FOREIGN PATENT DOCUMENTS 0 218 302 A2   4/1987   European Pat. Off. .
0 346 218 A1   12/1989  European Pat. Off. .
0 424 259 A1   4/1991   European Pat. Off. .
WO 87/02655    5/1987   WIPO .
WO 94/21359    9/1994   WIPO .
WO 94/21555    9/1994   WIPO .

Primary Examiner—Steven P. Griffin
Assistant Examiner—Timothy C Vanoy
Attorney, Agent, or Firm—Burgess, Ryan & Wayne

[57] ABSTRACT

A method for removing the sulphur compounds $H_2S$, $SO_2$ and at least one of COS and $CS_2$ contained in a waste gas is provided. In this method, the waste gas is catalytically hydrolyzed to form a hydrolyzed gas containing $H_2S$ and $SO_2$, which is free of COS and $CS_2$. After cooling, the hydrolyzed gas is introduced in one of two Claus catalytic zones mounted in parallel, while the other catalytic zone is regenerated and cooled. The regeneration is carried out with a gas stream drawn from the hydrolyzed gas before it is cooled, the regeneration gas effluent from the Claus catalytic zone is re-injected into the hydrolyzed gas between the drawing of the regeneration gas stream and the cooling of the hydrolyzed gas. The cooling of the Claus catalytic zones is carried out with a portion of unhydrolyzed gas drawn from the waste gas, the cooling gas effluent from the Claus catalytic zone is re-introduced into the waste gas between the drawing of the unhydrolyzed gas portion and a heating of the waste gas before hydrolysis.

12 Claims, 1 Drawing Sheet

PROCESS FOR REMOVING SULFUR COMPOUNDS OUT OF A GAS

BACKGROUND OF THE INVENTION

1) Field of the Invention

The invention relates to a process for removing the sulphur compounds $H_2S$, $SO_2$, COS and/or $CS_2$ contained in a residual sulphur-plant gas, with the said compounds being recovered in the form of sulphur.

2) Background Art

Residual gases from sulphur plants, in which sulphur is produced by the Claus process of controlled oxidation of an acid gas containing $H_2S$ by means of a gas containing free oxygen, contain of the order of 0.2% to 4% by volume of sulphur compounds, a large proportion of which consists of $H_2S$, the remainder consisting of $SO_2$, COS, $CS_2$ and sulphur vapour and/or vesicular sulphur.

Residual gases of this type are commonly treated to reduce their overall sulphur compound content as much as possible, in order to allow them to be discharged to the atmosphere after they have been incinerated, while meeting the standards imposed by law in terms of atmospheric pollution, and at the same time to recover these sulphur compounds in a form which contributes to increasing the yield of useful products formed from the acid gas treated in the sulphur plant.

Document EP-A-0346218 describes a process for removing the sulphur compounds $H_2S$, $SO_2$, COS and/or $CS_2$ contained in a residual sulphur-plant gas with the said compounds being recovered in the form of sulphur, which process consists (i) in bringing the residual gas from the sulphur plant into contact with a catalyst for the hydrolysis of the compounds COS and $CS_2$ into $H_2S$, which is arranged in a hydrolysis unit, while operating at a temperature sufficient to produce a hydrolysed residual gas which contains $H_2S$ and $SO_2$ and is substantially free from COS and $CS_2$, (ii) in conveying the hydrolysed residual gas, after a step of cooling to a temperature below the dew point of the sulphur in the gas, to a purification unit consisting of a plurality of catalytic zones, each containing a catalyst which promotes the Claus reaction, referred to as a Claus catalyst, and each operating in turn in reaction phase then in regeneration phase and finally in cooling phase so that, at any time, there is at least one catalytic zone in reaction phase and one catalytic zone in regeneration or cooling phase, (iii) in passing the hydrolysed residual gas conveyed to the purification unit through the catalytic zone or zones in reaction phase, while operating at temperatures below the dew point of sulphur, so that the compounds $H_2S$ and $SO_2$ present in the said gas react with one another to form sulphur which deposits on the Claus catalyst contained in the said zones, and so that a substantially purified residual gas is obtained at the outlet of the purification unit, (iv) in circulating a non-oxidizing gas stream having a temperature of between 200° C. and 500° C., more particularly between 250° C. and 400° C., through the catalytic zone in regeneration phase which contains Claus catalyst loaded with sulphur, in order to regenerate the said catalyst and form an effluent gas loaded with vaporized sulphur, and (v) in passing a gas stream having a temperature below 160° C. through the catalytic zone containing the catalyst which has just been regenerated, in order to cool the said catalyst to the temperature required for again bringing it into contact with the hydrolysed residual gas.

In a variant of this process, as described in document EP-A-0424259, a gas flow containing free oxygen is introduced into the hydrolysis unit, and partial oxidation of $H_2S$ into $SO_2$, and optionally into sulphur, is carried out in the said hydrolysis unit by means of the said gas flow in contact with an $H_2S$ oxidation catalyst contained in this unit, it being possible for the said catalyst to consist of the catalyst of the hydrolysis of the compounds COS and $CS_2$ into $H_2S$, the flow rate of the said gas flow being controlled so as to keep the $H_2S:SO_2$ molar ratio in the hydrolysed residual gas entering the purification unit at a value substantially equal to 2:1.

In another variant, which forms the subject-matter of the French Patent Application No. 9512988 filed on Mar. 11, 1995 in the name of the Applicant Company, and which is applicable both to the process in document EP-A-0346218 and to the process in document EP-A-0424259, the procedure adopted is such that the substantially purified residual gas leaving the purification unit contains $H_2S$ as the only sulphur compound in a concentration of less than 0.5% by volume, and the said substantially purified residual gas is passed through a unit for catalytically oxidizing the residual $H_2S$ into sulphur, which operates at a low temperature, that is to say at a temperature of below 150° C., and for example ranging from 90° C. to 130° C., in order to complete the purification of the gas.

In the aforementioned process and its variants, the regeneration of the catalyst which is loaded with sulphur and the cooling of the regenerated catalyst are carried out by circulating the regeneration gas and the cooling gas in closed circuit by means of a blower, with heating and cooling equipment being used to bring the regeneration gas and the cooling gas to the appropriate temperatures.

SUMMARY OF THE INVENTION

It has now been found that the regeneration of the catalyst which is loaded with sulphur and the cooling of the regenerated catalyst could be undertaken simply and efficiently using gas streams which are drawn off from the process and flowing in open circuit at the temperature needed to bring about the said regeneration and the said cooling. This makes it possible to dispense with the equipment for heating and cooling the regeneration gas, as well as the blower, these being essential if the regeneration and the cooling of the catalyst are undertaken in closed circuit.

The invention therefore relates to a process for removing the sulphur compounds $H_2S$, $SO_2$, COS and/or $CS_2$ contained in a residual sulphur-plant gas with the said compounds being recovered in the form of sulphur, which process consists (i) in bringing the residual gas from the sulphur plant into contact with a catalyst for the hydrolysis of the compounds COS and $CS_2$ into $H_2S$, which is arranged in a hydrolysis unit, while operating at a temperature sufficient to produce a hydrolysed residual gas which contains $H_2S$ and $SO_2$ and is substantially free from COS and $CS_2$, (ii) in conveying the hydrolysed residual gas, after a step of cooling to a temperature below the dew point of sulphur, to a purification unit consisting of a plurality of catalytic zones, each containing a catalyst which promotes the Claus reaction, referred to as a Claus catalyst, and each operating, in turn, in reaction phase then in regeneration phase and finally in cooling phase so that, at any time, there is at least one catalytic zone in reaction phase and one catalytic zone in regeneration or cooling phase, (iii) in passing the hydrolysed residual gas conveyed to the purification unit through the catalytic zone or zones in reaction phase, while operating at temperatures below the dew point of sulphur, so that the compounds $H_2S$ and $SO_2$ present in the said gas react with one another to form sulphur which deposits on the catalyst contained in the said zones, and so that a substantially purified residual gas is obtained at the outlet of the purification unit, (iv) in circulating a non-oxidizing gas stream having a temperature of between 200° C. and 500° C., more particularly between 250° C. and 400° C., through the catalytic zone in regeneration phase which contains Claus catalyst loaded with sulphur, in order to regenerate the said catalyst and form an effluent gas loaded with vaporized sulphur, and (v) in passing a gas stream having a temperature below 160° C. through the catalytic zone containing the catalyst which has just been regenerated, in order to cool the said catalyst to the temperature required for again bringing it into contact with the hydrolysed residual gas, and is characterized in that at least a fraction of the hydrolysed residual gas leaving the hydrolysis, unit, is drawn off to form all of the gas stream circulating through the catalytic zone in regeneration phase, and all of the effluent gas leaving the said zone is reinjected into the hydrolysed residual gas conveyed to the purification unit, at a point located downstream of the said withdrawal and upstream of the cooling step which involves, during the regeneration phase, condensation of the vaporized sulphur and to which the hydrolysed residual gas is subjected before it enters the purification unit, and in that at least a fraction of the residual gas which is to be treated and is conveyed to the hydrolysis unit is drawn off to form all of the cooling gas stream flowing in contact with the catalyst which has just been regenerated and is present in the catalytic zone in cooling phase, and all of the effluent gas leaving this zone is reintroduced into the said residual gas, at a point located downstream of this withdrawal and upstream of a step of heating the residual gas before the said gas is introduced into the hydrolysis unit.

The gas fraction drawn off from the hydrolysed residual gas to form the gas stream circulating through the catalytic zone in regeneration phase may represent 30% to 100% of the flow rate of the said hydrolysed residual gas. In particular, the said fraction represents 30% to 80% and more especially 40% to 60% of the flow rate of the hydrolysed residual gas.

Similarly, the gas fraction drawn off from the residual gas to be treated in order to form the cooling gas stream which flows in contact with the catalyst which has just been regenerated and is present in the catalytic zone in cooling phase, may also represent 30% to 100% of the flow rate of the said residual gas, the said fraction represents in particular 30% to 80% and more especially 40% to 60% of the flow rate of the residual gas to be treated.

DESCRIPTION OF THE DRAWING

The drawing is a diagrammatic representation of the process of the invention.

DESCRIPTION OF THE PREFERRED EMBODIMENTS

Figure 1:
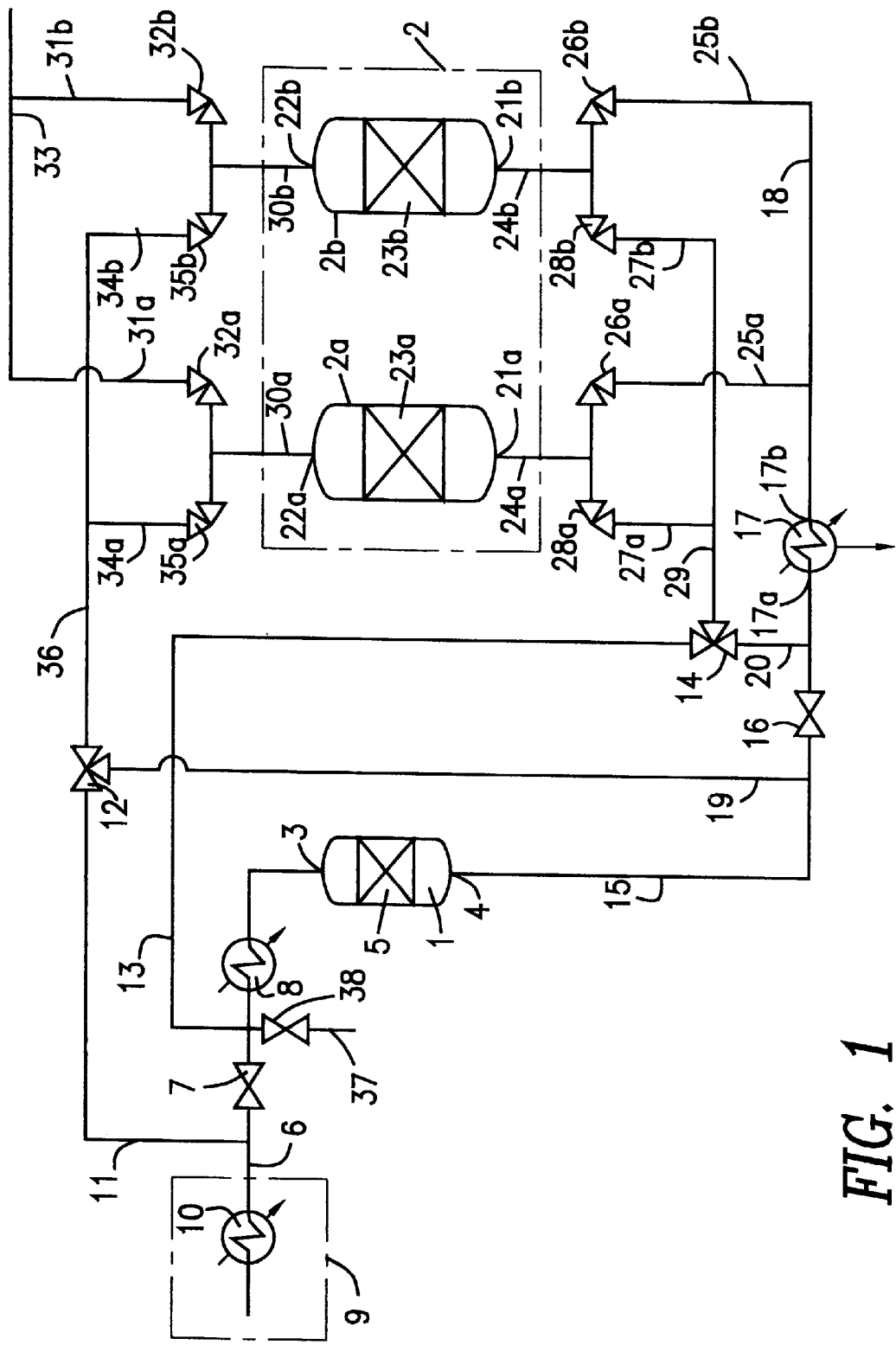

As indicated above, the compounds COS and $CS_2$ present in the residual gas are catalytically hydrolysed in the hydrolysis unit to form $H_2S$. In addition to this hydrolysis, it is further possible, by introducing a controlled flow rate of a gas flow containing free oxygen into the hydrolysis unit, as indicated in document EP-A-0424259, to carry out some degree of oxidation in this unit of the $H_2S$ contained in the residual gas into $SO_2$ and optionally into sulphur, in contact with an $H_2S$ oxidation catalyst contained in the said unit. The procedure advantageously adopted in this case is the gas flow containing free oxygen is introduced into the residual gas conveyed to the hydrolysis unit, at a point which is located downstream of the point at which the effluent gas leaving the catalytic zone in cooling phase is reintroduced into the said residual gas, and which preferably lies upstream of the step of heating the residual gas before the said gas is introduced into the hydrolysis unit.

Advantageously, the reaction of hydrolysing the compounds COS and $CS_2$ into $H_2S$ and, when it is used, the $H_2S$ oxidation reaction which are undertaken in the hydrolysis unit are carried out at temperatures between 180° C. and 600° C., preferably between 250° C. and 400° C.

When only hydrolysis of the compounds COS and $CS_2$ to form $H_2S$ is carried out in the hydrolysis unit, the said unit contains a catalyst which promotes this hydrolysis reaction. However, when both hydrolysis of the compounds COS and $CS_2$ to form $H_2S$ and oxidation of $H_2S$ are carried out in the hydrolysis unit, the said unit may contain either a catalyst which promotes the hydrolysis reaction and a catalyst which promotes the oxidation reaction, which are used as a mixture or in the form of separate beds, or advantageously a single catalyst which can simultaneously promote both reactions.

Among the catalysts which can be used to promote the reaction of hydrolysing the compounds COS and $CS_2$ to form $H_2S$ and the $H_2S$ oxidation reaction, mention may in particular be made of:

catalysts which consist of activated aluminas;

catalysts combining at least one compound of a metal selected from Fe, Ni, Co, Cu, Zn, Cr and Mo with a silica and/or alumina support, for example the ones described in document FR-A-2327960;

catalysts which combine at least one transition metal compound with a thermally stabilized activated alumina support, for example the ones described in document FR-A-2540092, or with a silica and/or titanium oxide support, for example the ones described in document FR-A-2511663;

catalysts based on titanium oxide, and in particular catalysts consisting of titanium oxide, for example the ones described in document FR-A-2481145, or alternatively catalysts formed by a mixture of titanium oxide and an alkaline-earth metal sulphate, for example the ones described in document EP-A-0060741, or alternatively catalysts which combine a transition metal compound, in particular an Fe, Ni or Co compound, with a titanium oxide support, for example the ones described in document EP-A-0218302;

catalysts which combine at least one transition metal compound with a SiC support, for example the ones described in document FR-A-2734809.

The overall retention time of the gases, namely residual gas to be treated on its own or a mixture of the residual sulphur-plant gas and of the gas flow containing free oxygen, in contact with the catalyst or catalysts present in the hydrolysis unit, may range from 0.5 seconds to 10 seconds, and in particular from 1 second to 6 seconds, these values being given under standard temperature and pressure conditions.

The heating of the residual gas before it is introduced into the hydrolysis unit can be carried out by any known technique, in particular by indirect heat exchange with a fluid at suitable temperature.

The cooling of the hydrolysed residual gas from the hydrolysis unit, to a temperature below the dew point of sulphur, after effluent gas from the catalytic zone in regeneration phase has been reinjected into the said gas and before this gas is introduced into the purification unit, is advantageously carried out by indirect heat exchange with a cold fluid whose temperature is suitable for obtaining, on the one hand, condensation of the sulphur vapour contained in the gas and, on the other hand, the desired temperature at the inlet of the purification unit. The said cooling is carried out, for example, by employing an indirect heat exchanger of the sulphur condenser type.

The purification unit advantageously operates in such a way that, at any time, there is one catalytic zone, or a plurality of catalytic zones operating in parallel, in reaction phase and one catalytic zone in regeneration/cooling phase. The purification unit may also operate in such a way that, at any time, there is one catalytic zone, or a plurality of catalytic zones operating in parallel, in reaction phase and one catalytic zone in regeneration phase and one catalytic zone in cooling phase.

The temperature at which the reaction between $H_2S$ and $SO_2$ to form sulphur is undertaken, in the catalytic zone or zones of the purification unit which is or are in reaction phase, is between the dew point and the solidification point of the sulphur which is formed. The said temperature may therefore lie between 120° C. and 180° C., and more particularly ranges from 125° C. to 150° C.

The catalyst used in the catalytic zones of the purification unit may be selected from the products which are commonly used to promote the Claus reaction between $H_2S$ and $SO_2$ to form sulphur. In particular, the said catalyst may be, for example, bauxite, alumina, silica, titanium dioxide, zirconium dioxide, natural or synthetic zeolites, active carbon, a catalyst obtained by combining a compound of titanium or of a rare-earth metal such as lanthanum with an alumina support, as proposed in document FR-A-2658091, a catalyst consisting of titanium oxide containing an alkaline-earth metal sulphate such as $CaSO_4$, as described in document FR-A-2501532, a catalyst formed by titanium oxide or alumina impregnated with an iron, nickel or cobalt compound, as proposed in document EP-A-0218302, or alternatively a catalyst formed by a transition metal compound combined with an SiC support, as proposed in document FR-A-2734809.

The $H_2S$: $SO_2$ molar ratio in the hydrolysed residual gas introduced into the purification unit should be substantially equal to 2:1 or, if desired, greater than this value and, for example, between 2:1 and 4:1.

It is possible to maintain the $H_2S:SO_2$ molar ratio at the desired value by controlling the operation of the sulphur plant from which the residual gas to be treated originates, as described in document EP-A-0346218 or in French Patent Application No. 9512988, or alternatively by controlling the flow rate of the gas flow containing free oxygen which is injected into the hydrolysis unit, when this variant is used to regulate the said molar ratio, as proposed in document EP-A-0424259 or in French Patent Application No. 9512988.

When the purification unit treats a hydrolysed residual gas containing $H_2S$ and $SO_2$ in a molar ratio substantially equal to 2:1, the purified residual gas leaving the purification unit is generally subjected to thermal or catalytic incineration so as to convert into $SO_2$ all the sulphur compounds which it may still contain in a very small overall quantity, before being discharged to the atmosphere.

When the purification unit treats a hydrolysed residual gas containing $H_2S$ and $SO_2$ in an $H_2S:SO_2$ molar ratio of greater than 2:1, and for example such that the concentrations of $H_2S$ and $SO_2$ in the said gas, expressed as percentages by volume ($H_2S$) and ($SO_2$), are such that the quantity ($H_2S$)-2($SO_2$) is between 0.1% and 0.5%, the purified residual gas leaving the purification unit essentially contains $H_2S$ as sulphur compound. Advantageously, the said purified residual gas is made to flow through a catalytic oxidation unit in which the residual $H_2S$ is oxidized selectively to form sulphur by means of a gas containing free oxygen in contact with a suitable catalyst and at temperatures below the dew point of sulphur, and for example ranging from 60° C. to 150° C. and more especially from 90° C. to 130° C., in order to complete the purification of the gas.

The oxidation catalyst may, in particular, be formed by an active phase, consisting of one or more oxides and/or salts of one or more transition metals such as Ni, Co, Fe, Cu, Ag, Mn, Mo, Cr, W and V, deposited on a support made from a refractory material such as, for example, bauxite, activated and/or stabilized alumina, silica, titanium oxide, zirconium oxide, zeolites, silica/alumina mixtures, silica/titanium oxide mixtures, silica/zirconium oxide mixtures, titanium oxide/alumina mixtures, refractory carbide and, in particular, SiC, or alternatively on an active carbon support. This catalytic oxidation may be employed in a way similar to that indicated, in particular, in French Patent Application No. 9512988, or in one or other of the documents EP-A-0218302, FR-A-2702673 and FR-A-2727101.

If need be, the effluent gas leaving the catalytic oxidation unit may also be subjected to thermal or catalytic incineration before being discharged to the atmosphere.

In the embodiment of the process according to the invention, in which the residual gas leaving the purification unit is made to pass through a catalytic oxidation unit, the procedure adopted is advantageously such that each CLAUS catalytic zone of the purification unit has associated with it, in series, a catalytic oxidation zone belonging to the catalytic oxidation unit, each pair thus formed by a CLAUS catalytic zone and by a catalytic oxidation zone operating in turn in reaction phase, then in regeneration phase and finally in cooling phase. Advantageously, the procedure adopted is such that, at any time, there is at least one pair of zones in reaction phase and one pair of zones in regeneration/cooling phase. A procedure may also be adopted such that, at any time, there is one or more pairs of zones in reaction phase, one pair of zones in regeneration phase and one pair of zones in cooling phase.

In the above embodiment, the hot gas stream which circulates in the CLAUS catalytic zone, in regeneration phase, of the purification unit then passes into the associated catalytic oxidation zone, also in regeneration phase, of the catalytic oxidation unit and all of the effluent gas leaving the said catalytic oxidation zone, in regeneration phase, forms the effluent gas which is reinjected into the hydrolysed residual gas conveyed to the purification unit, while the cooling gas stream flowing in contact with the catalyst which has just been regenerated and is present in the CLAUS catalytic zone, in the cooling phase, of the purification unit, then passes into the associated catalytic oxidation zone, also in cooling phase, of the catalytic oxidation unit and all of the effluent gas leaving the said catalytic oxidation zone, in cooling phase, forms the effluent gas which is reintroduced into the residual gas conveyed to the hydrolysis unit.

As indicated above, after the effluent gas leaving the CLAUS catalytic zone, in cooling phase, of the purification unit or else leaving the associated catalytic oxidation zone, in cooling phase, of the catalytic oxidation unit has been reinjected into the residual gas to be treated, this residual gas to be treated is heated to an appropriate temperature before it is introduced into the hydrolysis unit. When the purified gas is subjected to incineration before it is discharged to the atmosphere, the said heating of the residual gas to be treated is advantageously carried out by indirect heat exchange between the said residual gas and the hot product gases resulting from this incineration.

DESCRIPTION OF THE DRAWINGS

The invention will be understood more clearly on reading the following description of one of its embodiments, using the device diagrammatically represented in the single FIGURE of the appended drawing.

This device has a hydrolysis unit 1 and a purification unit 2 which is formed by two catalytic reactors 2a and 2b, the said reactors being mounted in parallel.

The hydrolysis unit 1 has an inlet 3 and an outlet 4 which are separated from one another by a fixed bed 5 of a catalyst for the hydrolysis of the compounds COS and $CS_2$ into $H_2S$. A gas feed line 6, which contains a valve 7 for restricting flow rate and the cold circuit of an indirect heat exchanger 8 of the gas/gas exchanger type, joins the inlet 3 of the hydrolysis unit 1 to the source of the residual gas to be treated, for example the outlet of a sulphur plant 9, the said outlet being formed by the last sulphur condenser 10 of the sulphur plant. Branched on to the line 6, there are a line 11, arranged upstream of the valve 7 and connected to the first of the orifices of a three-way valve 12, and a line 13, arranged between the valve 7 and the heat exchanger 8 and connected to the first of the orifices of a three-way valve 14. Optionally a gas containing free oxygen can be introduced into the residual gas in line 6 through a conduit 37 and valve 38 to provide for additional oxidation of $H_2S$ to $SO_2$ and sulfur in the hydrolysis unit.

The outlet 4 of the hydrolysis unit 1 continues in a line 15 for removing the gases, the said line being connected, through a flow-rate restriction valve 16, to the inlet 17a of an indirect heat exchanger 17 of the sulphur condenser type, the outlet 17b of which continues in a line 18. Branched on to the line 15, there are a line 19, arranged upstream of the valve 16 and connected to the second of the orifices of the three-way valve 12, and a line 20, arranged between the valve 16 and the heat exchanger 17 and connected to the second orifice of the three-way valve 14.

The reactor 2a of the purification unit 2 has a first passage 21a and a second passage 22a, which are separated by a fixed bed 23a of a catalyst which promotes the Claus reaction between $H_2S$ and $SO_2$ to form sulphur. Similarly, the reactor 2b of the purification unit 2 has a first passage 21b and a second passage 22b, which are separated by a fixed bed 23b of a catalyst which promotes the said Claus reaction. The first passage 21a of the reactor 2a continues in a line 24a which is connected, on the one hand, by a line 25a provided with a valve 26a to the line 18 continuing the outlet 17b of the heat exchanger 17 and, on the other hand, by a line 27a provided with a valve 28a to a line 29 which is itself connected to the third orifice of the three-way valve 14. Similarly, the first passage 21b of the reactor 2b continues in a line 24b which is connected, on the one hand, by a line 25b provided with a valve 26b to the line 18 continuing the outlet 17b of the heat exchanger 17 and, on the other hand, by a line 27b provided with a valve 28b to the said line 29.

The second passage 22a of the reactor 2a is provided with a line 30a which is connected, on the one hand, by a line 31a provided with a valve 32a to a line 33 for removing the purified residual gas and, on the other hand, by a line 34a provided with a valve 35a to a line 36 connected to the third orifice of the three-way valve 12. Similarly, the second passage 22b of the reactor 2b is provided with a line 30b which is connected, on the one hand, by a line 31b provided with a valve 32b to the line 33 for removing the purified residual gas and, on the other hand, by a line 34b provided with a valve 35b to the said line 36.

The way in which the process takes place in this device may be outlined as follows.

It will be assumed that the reactor 2a is in reaction phase and the reactor 2b is in regeneration phase. In this situation, the valves 26a, 32a, 28b and 35b are open, while the valves 28a, 35a, 26b and 32b are closed. Furthermore, the valve 7 is fully open and creates no flow-rate restriction for the gas stream flowing through it, while the valve 16 is only partially open and creates a flow-rate restriction which forces a fraction of the gas stream arriving via the line 15 to enter the line 19. Finally, the valve 12 is set to place the line 19 in communication with the line 36, while the valve 14 is set to place the line 29 in communication with the line 20.

The residual gas to be treated, which leaves the last sulphur condenser 10 of the sulphur plant 9 and contains $H_2S$, $SO_2$, COS and $CS_2$, flows through the valve 7, then is heated to the appropriate temperature by flowing through the indirect heat exchanger 8, before being introduced into the hydrolysis unit 1, in which the compounds COS and $CS_2$ present in the said residual gas are hydrolysed to form $H_2S$ in contact with the catalyst contained in the hydrolysis unit. Furthermore, the hydrolysis unit is also capable, if the nature of the catalyst so allows, of carrying out the Claus reaction between $H_2S$ and $SO_2$.

Hydrolysed residual gas which contains $H_2S$ and $SO_2$, and possibly sulphur vapour, and is substantially free from COS and $CS_2$, is removed via the line 15 continuing the outlet 4 of the hydrolysis unit. Because of the flow-rate restriction created by the valve 16, a fraction of the hydrolysed gas arriving via the line 15 is diverted into the line 19, while the remaining part of the said gas flows through the valve 16 and, downstream of the said valve, via the line 20, receives the regeneration effluent gas which comes from the reactor 2b and arrives via the line 29 and the valve 14.

The mixture of hydrolysed residual gas flowing through the valve 16 and regeneration effluent gas circulating in the line 20 enters the heat exchanger 17, in which the said mixture is cooled to a temperature between the dew point and the solidification point of the sulphur, so that the sulphur contained in this mixture becomes separated by condensation in liquid form, and so that a residual gas stream which is hydrolysed and has a low elementary sulphur content is removed from the exchanger 17, via the line 18, which gas stream is conveyed, via the line 25a, the valve 26a and the line 24a, into the reactor 2a in reaction phase.

In the reactor 2a, the compounds $H_2S$ and $SO_2$ present in the hydrolysed residual gas react with one another, in contact with the Claus catalyst contained in the reactor, to form sulphur which deposits on the said catalyst. A purified residual gas leaves via the line 30a continuing the outlet 22a of the reactor 2a and is sent via the line 31a, through the valve 32a, into the line 33 for removing the purified residual gas. The purified residual gas circulating in the line 33 may be sent, as indicated above, depending on the nature of the residual sulphur compounds which it contains ($H_2S$ alone or $H_2S$ and $SO_2$) and the overall concentration of the said compounds, to an additional catalytic oxidation unit and/or to an incineration unit.

The hydrolysed residual gas stream diverted via the line 19 and circulating through the valve 12 and the line 36 is introduced into the reactor 2b via the line 34b, through the valve 35b and the line 30b, and flushes the Claus catalyst which is loaded with sulphur and is contained in the said reactor 2b, so as to vaporize this sulphur and thus regenerate the catalyst. An effluent gas formed by the said flushing gas stream which entrains the vaporized sulphur is removed via the line 24b continuing the outlet 21b of the reactor 2b, which effluent gas is conveyed, through the valve 28b and the line 27b, to the line 29 in order to be reinjected, through the valve 14 and the line 20, into the hydrolysed residual gas circulating in the line 15 between the valve 16 and the heat exchanger 17.

After the catalyst contained in the reactor 2b has been flushed for a sufficient amount of time by the hydrolysed residual gas fraction diverted via the line 19 from the hydrolysed residual gas leaving the hydrolysis reactor, to remove all of the sulphur deposited on the catalyst, the setting of the valves 12 and 14 is changed so that the valve 12 places the line 11 in communication with the line 36 and the valve 14 places the line 29 in communication with the line 13, and the degree to which the valves 7 and 16 are open is adjusted so that the valve 7 is partially open and thus creates a flow-rate restriction, which forces a fraction of the gas stream conveyed by the line 6 to enter the line 11, and so that the valve 16 is fully open and creates no flow-rate restriction for the gas stream flowing through it.

The flushing of the regenerated catalyst contained in the reactor 2b, using the residual gas fraction diverted via the line 11 from the residual gas to be treated leaving the sulphur plant via the line 6, is then continued over a length of time appropriate for cooling the said catalyst. An effluent gas formed by the flushing gas stream consisting of the said residual gas fraction is then removed via the line 24b continuing the outlet 21b of the reactor 2b, which effluent gas is conveyed, through the valve 28b and the line 27b, to the line 29 in order to be reinjected, through the valve 14 and the line 13, into the residual gas stream to be treated which is circulating in the line 6 between the valve 7 and the heat exchanger 8.

When the catalyst contained in the reactor 2b has been cooled to a suitable temperature allowing it to be reused in reaction phase, the roles played by the reactors 2a and 2b are swapped, that is to say the reactor 2b is put in Claus reaction phase and the reactor 2a is put in regeneration/cooling phase. In order to do this, the valves 35b and 28b are closed and the valves 26b and 32b are opened, and the valves 26a and 32a are closed, with the result that the reactor 2b is put in reaction phase. The valves 12 and 14 are then positioned to respectively place the line 19 in communication with the line 36 and the line 29 in communication with the line 20. Finally, the valves 35a and 28a are opened in order to establish the circulation of the hot regeneration gas through the reactor 2a, which then operates in regeneration phase. After a sufficient regeneration time, the reactor 2a is then changed to cooling phase, as indicated above with reference to the reactor 2b.

The arrangement of the circuits for feeding gas to the reactor in reaction phase or to the reactor in regeneration/cooling phase, and of the circuits for removing gas from the said reactors, may be different from the one which has just been described, without thereby departing from the scope of the invention. Thus, for example, the circulation circuit of the residual gas fraction used to cool the Claus catalyst which has just been regenerated could be modified so that the gas stream diverted via the line 11 is introduced, via the line 24b, into the reactor 2b in cooling phase, and is removed from the said reactor via the line 30b to be returned to the line 13.

Similarly, a device for implementing the process according to the invention associating, in series, a purification unit with a catalytic oxidation unit may be obtained from the device schematically represented in the FIGURE of the appended drawing, by constructing each of the reactors 2a and 2b in the form of a mixed reactor which includes, between its extreme passages (21a and 22a in the case of reactor 2a, and 21b and 22b in the case of reactor 2b), as indicated in French patent application No. 9512988, a CLAUS catalytic zone, containing a bed of a CLAUS catalyst, on top of which there is a catalytic oxidation zone, containing a bed of a catalytic oxidation catalyst and equipped with an air injection line, the said zones communicating, on the one hand, through a first connection line on which an indirect heat exchanger is mounted and, on the other hand, by a second connection line equipped with a shut-off valve.

To complete the description of the process according to the invention which was given above, an example of the use of the said process will be given below without implying any limitation.

EXAMPLE

Using a device which is similar to the one schematically represented in the FIGURE of the appended drawing and which operates as described above, a residual sulphur-plant gas was treated which had the following composition in percentages by volume, with the exception of sulphur vapour and vesicular sulphur.

| | | |
|---|---|---|
| $H_2S$:0.94 | $H_2O$:33.10 | $CO$:0.40 |
| $SO_2$:0.47 | $N_2$:60.60 | $COS$:0.07 |
| $CO_2$:1.84 | $H_2$:2.55 | $CS_2$:0.03 |

The hydrolysis unit contained a catalyst promoting the hydrolysis of the compounds COS and $CS_2$ into $H_2S$, said catalyst consisting of 4 mm diameter extrudates of titanium oxide containing 10% by weight of calcium sulphate.

Each of the reactors 2a and 2b of the purification unit 2 contained a Claus catalyst consisting of 2 to 5 mm diameter beads of an activated alumina impregnated with 7% by weight of titanium oxide and having a specific surface, determined by the nitrogen adsorption method referred to as the BET method (standard NF X 11-621), equal to about 240 $m^2$/g.

The residual gas to be treated, arriving from the sulphur plant with a flow rate of 10,000 $m^3$(stp)/hour, i.e. 446 kmole/hour, and a temperature of 130° C., was heated to 300° C. in the indirect heat exchanger 8 and was then introduced at this temperature into the hydrolysis unit. The retention time of the residual gas in contact with the catalyst contained in the said hydrolysis unit was equal to 4 seconds under standard temperature and pressure conditions. The hydrolysed residual gas leaving the hydrolysis unit contained no more than traces of COS and $CS_2$, the degree of hydrolysis of these compounds being more than 99%, and its overall $H_2S$ and $SO_2$ level was less than that which could have been predicted on the basis of the COS and $CS_2$ hydrolysis reactions alone, which indicates that sulphur is also formed by the Claus reaction. The temperature at the outlet of the hydrolysis unit 1 was equal to 309° C.

A fraction of the hydrolysed residual gas, corresponding to a flow rate of 5055 $m^3$(stp)/hour, was diverted via the line 19, and the rest of the hydrolysed residual gas flowed through the valve 16. The gas stream resulting from mixing the hydrolysed residual gas with the regeneration effluent arriving via the line 20 entered the indirect heat exchanger 17 of the sulphur condenser type with a flow rate of 10069 m³(stp)/hour, i.e. 449 kmole/hour, and a temperature of 294° C. The gas stream leaving the indirect heat exchanger 17 had a flow rate of 10025 m³(stp)/hour, i.e. 447 kmole/hour, and a temperature of 128° C. and was introduced under these flow-rate and temperature conditions into the reactor 2a operating in a reaction phase. In the said reactor, the compounds $H_2S$ and $SO_2$ contained in the hydrolysed residual gas reacted with one another in contact with the Claus catalyst to form a sulphur which deposited on the catalyst, with a substantially purified residual gas being produced which had a temperature of about 146° C. and contained $H_2S$ and $SO_2$ in an $H_2S:SO_2$ molar ratio equal to 2:1 and in an overall concentration equal to 1400 ppm by volume, which purified gas was removed from the reactor 2a via the line 30a and then conveyed via the line 31a, through the valve 32a, into the line 33 for removing the treated residual gas.

The flushing gas used for regenerating the catalyst which was loaded with sulphur and contained in the reactor 2b in regeneration phase consisted of the fraction, having a flow rate of 5055 m³(stp)/hour, drawn off via the line 19 from the hydrolysed residual gas leaving the hydrolysis unit, the said fraction having a temperature of 280° C. during its introduction, via the lines 36, 34b and 30b, into the reactor 2b in regeneration phase. The effluent gas which was loaded with sulphur and left the reactor 2b via the line 24b was then reintroduced, via the lines 29 and 20, into the hydrolysed residual gas conveyed to the heat exchanger 17, the mixture formed in this way having, as indicated above, a temperature of 294° C. and a flow rate of 10069 m³(stp)/hour at the inlet of the said exchanger. The sulphur contained in this mixture, originating partly from the reactor 2b in regeneration phase and partly from the hydrolysis reactor 1, was condensed in this exchanger at 128° C.

The cooling gas used for cooling the catalyst which had just been regenerated consisted of a fraction, having a flow rate of 5100 m³(stp)/hour, which was drawn off, via the line 11, from the residual gas leaving the sulphur plant with a temperature of 130° C. The effluent gas leaving the reactor 2b in the cooling phase was reinjected via the lines 29 and 13, into the residual gas conveyed to the heat exchanger 8 preceding the hydrolysis unit.

The reactors 2a and 2b operated alternately for 30 hours in the reaction phase and for 30 hours, including 10 hours of cooling, in the regeneration/cooling phase.

The above purification device, operating under the conditions which have just been described, makes it possible to desulphurize residual sulphur-plant gases, reducing their sulphur compound content to 1400 ppm by volume of residual $H_2S+SO_2$. The purified gases are then incinerated before discharge to the atmosphere. Discharges of 1400 ppm by volume of residual $H_2S+SO_2$ correspond to an overall sulphur yield equal to 99.5% for the combination of the sulphur plant producing the residual gases to be purified and the purification device, the said yield being calculated on the basis of the $H_2S$ content of the acid gas charge introduced into the sulphur plant.

What is claimed is:

1. A process for removing sulphur compounds $H_2S$, $SO_2$, COS and/or $CS_2$ contained in a residual sulphur-plant gas with the said compounds being recovered in the form of sulphur, which process comprises i) bringing the residual gas from the sulphur plant into contact with a catalyst for hydrolysis of COS and $CS_2$ to $H_2S$, the catalyst being arranged in a hydrolysis unit, while operating at a temperature sufficient to produce a hydrolysed residual gas which contains $H_2S$ and $SO_2$ and is substantially free from COS and $CS_2$, (ii) conveying the hydrolysed residual gas, after a step of cooling to a temperature below the dew point of sulphur, to a purification unit comprising a plurality of catalytic zones, each containing a Claus catalyst which promotes a Claus reaction and each operating in turn in a reaction phase, then in a regeneration phase and finally in a cooling phase so that, at any time during the process, there is at least one catalytic zone operating in the reaction phase and one catalytic zone operating in the regeneration or cooling phase, (iii) passing the hydrolysed residual gas through the purification unit comprising a catalytic zone in a reaction phase, while operating at a temperature below a dew point of sulphur, so that $H_2S$ and $SO_2$ present in the gas react with one another to form sulphur which deposits on the catalyst in the catalytic zone, so that a substantially purified residual gas is obtained at the outlet of the purification unit, (iv) circulating a hot non-oxidizing gas stream having a temperature between 200 C. and 500 C. through the catalytic zone containing a Claus catalyst in the regeneration phase loaded with sulphur, to regenerate the Claus catalyst and form an effluent gas loaded with vaporized sulphur, and (v) passing a gas stream at a temperature below 160 C. through the catalytic zone containing the catalyst which has just been regenerated, in order to cool the catalyst to a temperature required for promoting the reaction between $H_2S$ and $SO_2$ wherein the improvement comprises utilizing at least a portion of the hydrolyzed, residual gas leaving the hydrolysis unit as all of said hot non-oxidizing gas stream that regenerates the sulphur loaded Claus catalyst, and injecting all of the regenerating gas leaving the Claus catalytic zone into the hydrolyzed residual gas conveyed to the purification unit at a point downstream of the location where the portion of the hydrolyzed, residual gas is withdrawn from the gas leaving the hydrolysis unit and upstream of the cooling zone through which the hydrolysed residual gas is passed before it enters the purification unit, and utilizing at least a portion of the unhydrolyzed, residual gas as the gas which cools the catalyst to a temperature required for bringing it into contact with the hydrolyzed, residual gas, and injecting the cooling gas leaving the catalytic zone into the residual gas stream, at a point downstream of the location where the unhydrolyzed, residual gas is withdrawn and upstream of a heating zone for the unhydrolyzed, residual gas before this residual gas is introduced into the hydrolysis unit.

2. The process according to claim 1, wherein the gas portion drawn off from the hydrolysed residual gas to form the regenerating gas stream circulating through the catalytic zone in the regeneration phase is 30% to 100% of the flow rate of the said hydrolysed residual gas.

3. The process according to claim 1 wherein the gas portion drawn off from the residual gas to be hydrolyzed in order to form the cooling gas stream which flows in contact with the catalyst which has just been regenerated is 30% to 100% of the flow rate of the said residual gas to be hydrolyzed.

4. The process according to claim 1, wherein a controlled flow of a gas containing free oxygen is introduced into the residual gas, at a point downstream of the location where the cooling gas stream is injected into the residual gas and upstream of the heating zone for the residual gas, to oxidize a portion of the $H_2S$ to $SO_2$.

5. The process according to claim 1, wherein the purification unit operates in such a way that, at any time during the process, there is at least one catalytic zone in the reaction phase and one catalytic zone in the regeneration/cooling phase.

6. The process according to claim 5, wherein the purification unit comprises a plurality of Claus catalytic zones operating in parallel.

7. The process according to claim 1, wherein the purification unit operates such that, at any time during the process, there is at least one catalytic zone in the reaction phase, at least one catalytic zone in the regeneration phase and at least one catalytic zone in the cooling phase.

8. The process according to claim 1, wherein the effluent gas leaving the purification unit is subjected to incineration before being discharged to the atmosphere.

9. The process according to claim 8 wherein the residual gas to be treated is heated before it is introduced into the hydrolysis unit by indirect heat exchange between the residual gas and the hot product gases resulting from incineration of the purified gas.

10. The process according to claim 1, wherein the purification unit treats a hydrolysed residual gas containing $H_2S$ and $SO_2$ in an $H_2S:SO_2$ molar ratio greater than 2:1, such that the concentrations of $H_2S$ and $SO_2$ in the gas, expressed as percentages by volume ($H_2S$) and ($SO_2$), are such that the quantity ($H_2S$)-2($SO_2$) is between 0.1% and 0.5% to produce a treated gas at the outlet of the purification unit containing essentially $H_2S$ as the sulphur compound, and passing the treated gas through a catalytic oxidation unit downstream of the purification unit in which the residual $H_2S$ is oxidized selectively to form sulphur by means of a gas containing free oxygen in contact with a catalyst and at temperatures below the dew point of sulphur, to produce a purified gas.

11. The process according to claim 10, wherein each Claus catalytic zone of the purification unit comprises, in series, the same catalytic oxidation zone of said catalytic oxidation unit and said Claus catalytic zone.

12. The process according to claim 10 wherein the purified effluent gas leaving the catalytic oxidation unit is subjected to thermal or catalytic incineration before being discharged to the atmosphere.

* * * * *